United States Patent
Udelle et al.

[11] Patent Number: 5,517,948
[45] Date of Patent: May 21, 1996

[54] ANIMAL TOY HAVING PIVOTALLY MOUNTED ANNULAR HALL CONFINING TRACK

[76] Inventors: Steven D. Udelle; Laura L. Udelle, both of 26414 Barranquilla Ave., Punta Gorda, Fla. 33983

[21] Appl. No.: 475,936

[22] Filed: Jun. 7, 1995

[51] Int. Cl.⁶ ............................................. A01K 29/00
[52] U.S. Cl. .......................... 119/706; 119/707; 446/168
[58] Field of Search .......................... 119/702, 706, 119/707, 711; 446/131, 136, 168, 170

[56] References Cited

U.S. PATENT DOCUMENTS

| | | | |
|---|---|---|---|
| 3,080,167 | 3/1963 | Hansard | 446/170 |
| 3,202,426 | 8/1965 | Carper | 446/170 |
| 4,722,299 | 2/1988 | Mohr | 119/707 |
| 5,269,261 | 12/1993 | McCance | 119/706 |

*Primary Examiner*—Todd E. Manahan

[57] ABSTRACT

An animal toy and claw scratching device comprising a movable circular closed circuit track ring 10 containing a ball 14 within a U-shaped cavity 12, including a pair of axles or dowels 16 protruding outward from the track ring 10. The track ring 10 surrounds a stationary housing assembly 8, and is connected by mating dowels 16 through openings 18 in the vertical sides 20 of stationary housing assembly 8. A pair of spring blades 28 assure a level attitude of the track ring 10 when at rest.

4 Claims, 2 Drawing Sheets

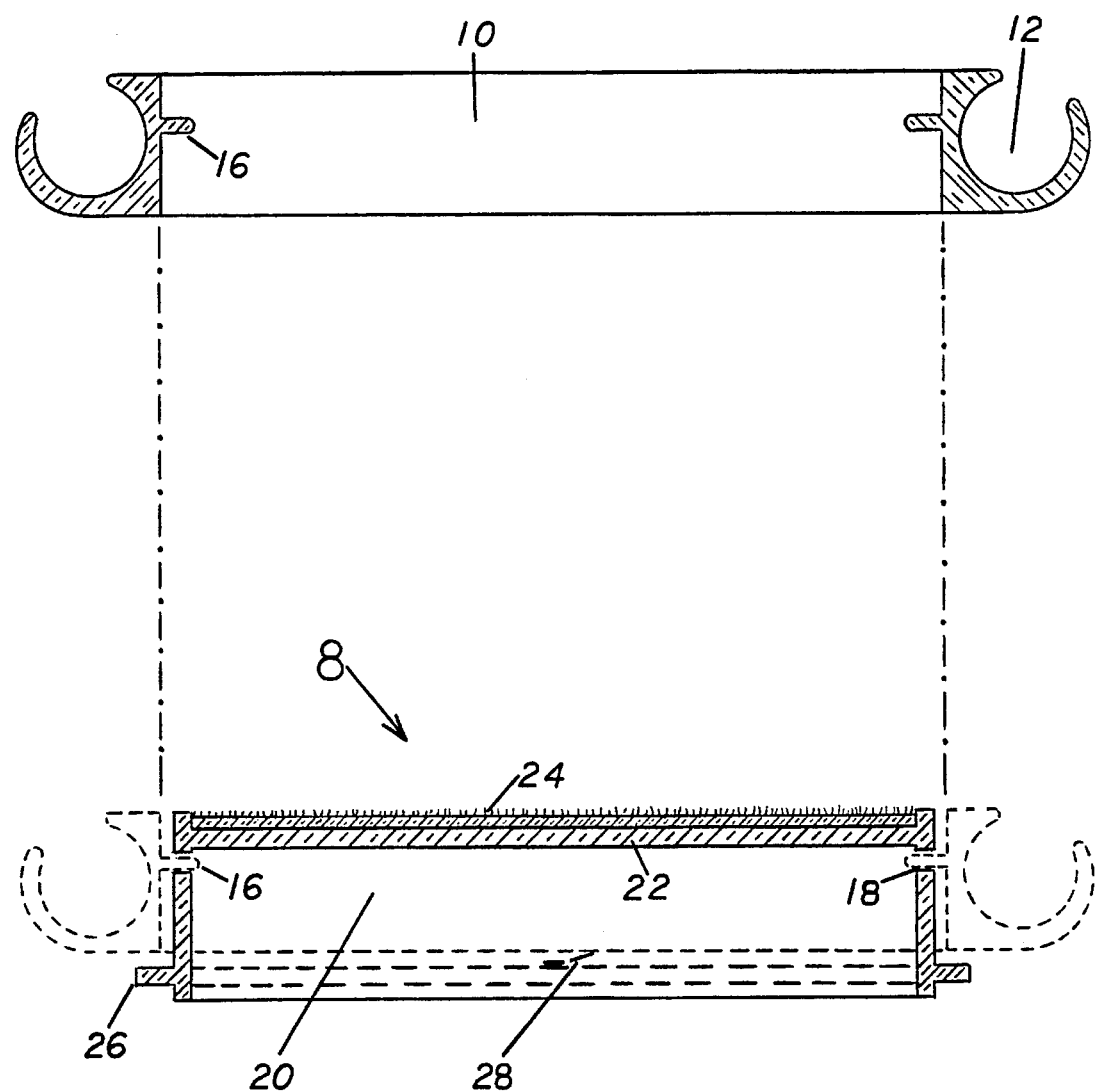

ANIMAL TOY HAVING PIVOTALLY MOUNTED ANNULAR HALL CONFINING TRACK

1. Field of the Invention

The present invention deals with animal toy and claw scratching devices, but more particularly to a combined animal device that provides claw scratching and indirect motion of an object within the device as a compelling attraction to an animal, whereby an animal will frequent the device on its own initiative more often, thereby improving its physical condition, health, and mental alertness through its own efforts.

2. Background-Discussion of the Prior Art

U.S. Pat. No. 5,269,261 by McCance, Dec. 14, 1993 shows a track and ball with a corrugated cardboard claw scratching means. Applicants have purchased this device and other ball track devices. The pet owner has to participate in moving the ball before a cat will join in. When the cat is claw scratching, the ball remains motionless and therefore does not present the incentive of motion. These purchased devices are seldom used, unless a human forces the ball into play. The prior art does not teach on the use of a motivational means that would exhibit an irresistible incentive or attraction to an animal, whereby the animal would benefit from increased use of the device more often.

SUMMARY OF THE INVENTION

The present invention takes advantage of the inherent instincts of an animal's response to a moving object, when the original movement of the object is not directly initiated by the animal or human hand, but by the device. Generally, the present invention comprises a closed circuit track ring confining a ball within its recess or U-shaped cavity. The open center area of the track ring or loop contains a carpeted platform housing for claw scratching. The circular track ring is connected to openings in the opposite vertical sides of the platform housing with an insertion dowel or axle allowing the track ring to tip or teeter. Any slight downward pressure on the track ring assembly will cause the track ring to move or tip as an animal mounts the carpeted platform, thereby causing a ball within the U-shaped cavity to move. Whenever an animal mounts the device for claw scratching, the lure or ball will move due to the slight tipping of the track ring upon contact. The movement of the ball will always produce a reaction from the animal, whereby chasing or swatting the ball is imminent.

It is therefore an object of the present invention to provide an animal toy and claw scratching device that does not require any direct contact with a lure ball by an animal or human hand to initiate a provocative movement of the lure ball.

It is an object of the present invention to have an animal expend its surplus energy, thereby developing improved muscle tone, alertness, coordination, and better sleeping habits.

It is an object of the invention that upon mounting the device, a cat will always respond to the moving lure.

It is another object that the animal toy and claw scratching device would relieve the animal from boredom by providing more frequenting, thereby saving areas of household furniture from damage.

Other objects and advantages may be readily determined by the following descriptions.

BRIEF DESCRIPTION OF THE DRAWINGS

FIG. 1b is an exploded front plan view in cross section of the device.

COMPLETE DESCRIPTION OF THE INVENTION

Figure 1A:
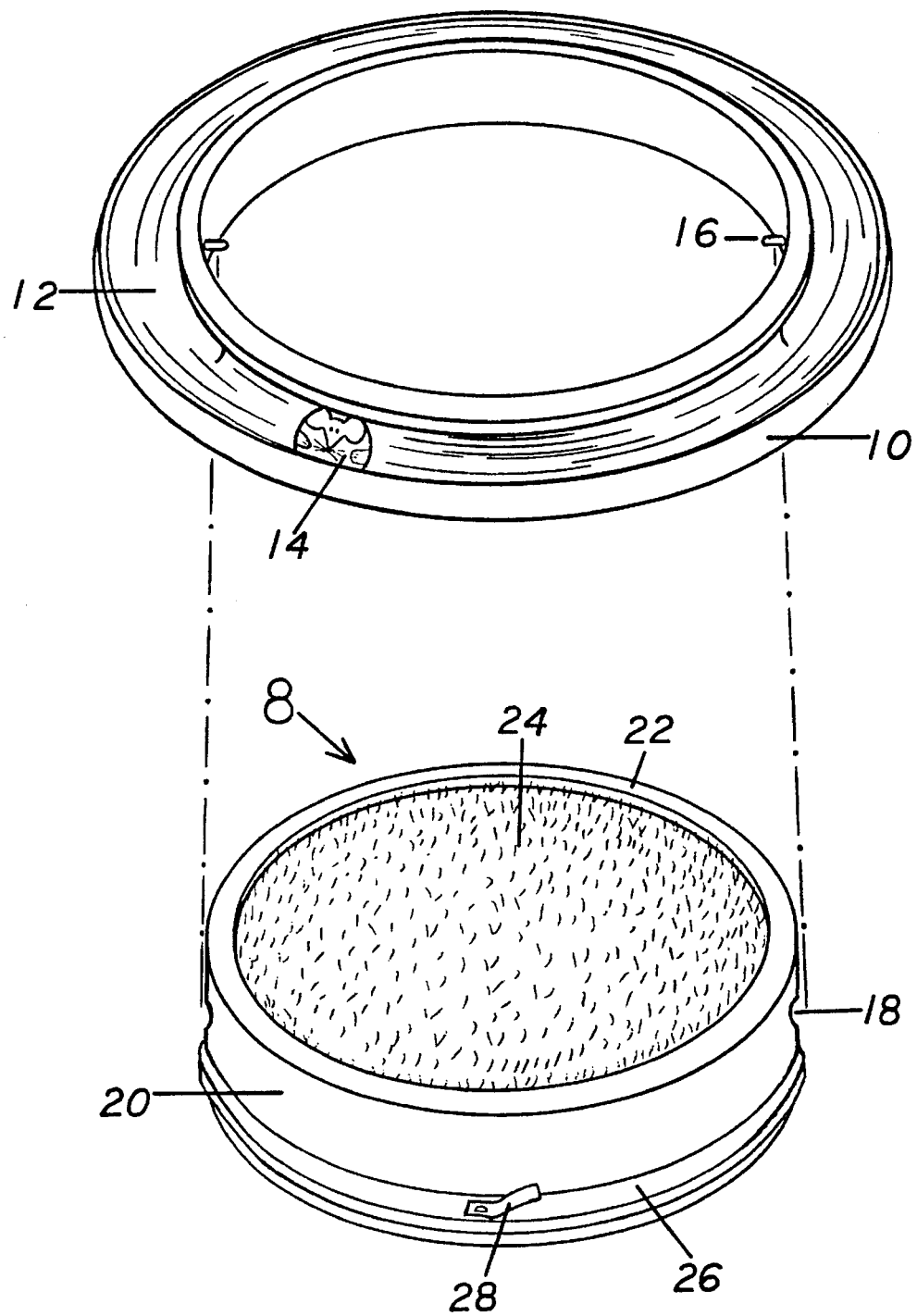
FIG. 1a is an assembly shown in an exploded perspective view of a circular U-shaped track ring, and a carpeted platform housing.

FIG. 1a is an exploded perspective view of the present invention, comprising a circular closed circuit track ring 10 provided with a recess or U-shaped cavity 12 for confining a movable object or lure ball 14 within. The center housing assembly 8 has a carpeted claw scratching platform 22. The outside vertical sides of the platform housing 20 contain openings 18 for insertion of dowels or axles 16 attached to the track ring 10. The track ring is sufficiently flexible for mating the dowels 16 to the housing openings 18. The track ring 10 surrounds the perimeter of the housing sides 20 and the only connection to the housing are the dowels or axles. These dowels 16 serve as a fulcrum to permit the track ring to teeter or tip. A soft spring 28 is attached to the top surface of the housing ledge 26 to assure a sufficiently level attitude of the track ring 10 bottom surface, whereby either side of the track ring when contacted will move downward and initiate movement of the ball. When an animal's foot or body puts a slight pressure on the top of the track ring, the ring will tilt downward, causing a solid plastic ball 14 to begin an orbit. This indirect, provocative motion of the ball or lure produces an imminent response from an animal. When the animal is in the act of claw scratching on the carpeting 24 attached to the platform 22, any slight contact with the outer ring will initiate movement of the ball. This concept of creating motion of a lure indirectly will provide more frequent use of the device and activity from an animal than relying on the human hand or animal directly moving a stationary lure on devices in current use.

FIG. 1b is an exploded front plan view in cross section of the device showing the track ring 10, a recess or U-shaped cavity 12, and the axles or dowels 16 in clearer detail. The single molded housing assembly 8 includes a platform 22 resembling a stage or arena floor, and has a suitable animal claw scratching material 24 attached thereto. The track ring 10 is shown in invisible lines surrounding the perimeter sides 20 of the housing 8. The dowels 16 are shown inserted within openings 18 of vertical sides 20 of the housing 8. A ledge .26 limits the downward movement of the track ring 10 and supports blade-type springs 28 affixed opposite to each other. The soft acting blade-type springs 28 provide a leveling function for the track ring 10 when at rest. The pressure from an animal's body or foot will deflect one side of the track ring 10 downward, easily opposing the spring tension 28, thereby causing the solid plastic ball to move. When the downward pressure is removed from the track ring 10, the spring 28 has sufficient stiffness to move the track ring 10 to a level attitude. This level attitude allows a space between the bottom of track ring 10 and the top surface of ledge 26 for downward movement of track ring 10 on either side.

CONCLUSION

Thus, it has been shown that the action of the present invention solves the shortcomings of passive devices, past and present, thereby satisfying the consumers investment with a realistic and more frequently used product. While the above descriptions contain many specific details, these should not be construed as limitations on the scope of the invention, but rather as examples of embodiments or modifications, herein detailed in accordance with the descriptive requirements of law. It should be understood that the details are to be interpreted as illustrative and not in a limiting sense.

We claim:

1. An animal toy and claw scratching device comprising:

a) a circular base and having a substantially planar top surface supported by a vertically oriented peripheral sidewall extending downwardly therefrom;

b) an annular ring forming a continuous track encircling said vertically oriented peripheral sidewall, said continuous track having an inner wall, an outer wall, a bottom, and an open top;

c) an object disposed within said continuous track and freely movable therein;

d) a pair of axles disposed at opposing points on said inner wall of said annular ring and extending along a diameter of said circular base, said axles extending outwardly from said annular ring toward said circular base and forming a pivot axis along said diameter;

e) a pair of holes disposed at corresponding opposing points in said peripheral sidewall of said base said axles being received within said holes and freely pivotal therein, said holes being disposed at a sufficient height on said peripheral sidewall such that said annular ring may pivot about said pivot axis; and f) biasing means disposed about said peripheral sidewall of said base for biasing said annular ring to a first position wherein said open top lies substantially parallel to said planar top surface of said base; whereby when said annular ring is pivoted from said first position about said pivot axis against said biasing means, said movable object is caused to rotate in said continuous track about said base.

2. An animal toy and scratching device as set forth in claim 1 wherein said biasing means comprises a pair of springs disposed on opposite sides of said base along a bottom edge thereof, said springs being disposed along a diameter of said base which is orthogonal to said pivot axis, each of said springs being in contact with said bottom of said annular ring when said annular ring is in said first position.

3. An animal toy and scratching device as set forth in claim 1 wherein said movable object comprises a plastic ball.

4. An animal toy and scratching device as set forth in claim 1 wherein said planar top surface of said base is provided with a soft surface for permitting an animal to sink its claws therein and thus function as a scratching pad for the animal.

* * * * *